(12) United States Patent
Gupta et al.

(10) Patent No.: US 7,009,798 B1
(45) Date of Patent: Mar. 7, 2006

(54) AUTOMATED CARTRIDGE EXCHANGE SYSTEM AND METHOD FOR HIGH-DENSITY AUTOMATED TAPE LIBRARIES

(75) Inventors: Sanjiv K. Gupta, Superior, CO (US); Mark W. Moyer, Golden, CO (US); Daniel J. Plutt, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 58 days.

(21) Appl. No.: 10/790,608

(22) Filed: Mar. 1, 2004

(51) Int. Cl.
*G11B 15/68* (2006.01)

(52) U.S. Cl. .................. 360/71; 360/96.6; 700/218; 700/228

(58) Field of Classification Search ............. 360/71, 360/69, 92–94, 96.6, 98.04–98.06, 99.06–99.07; 369/30.27–30.5; 414/268–270, 276–283, 414/331.01–331.18; 700/214, 218, 228, 700/245
See application file for complete search history.

(56) References Cited

U.S. PATENT DOCUMENTS

| | | | |
|---|---|---|---|
| 4,864,511 A * | 9/1989 | Moy et al. .................. 360/92 |
| 5,700,125 A | 12/1997 | Falace et al. | |
| 6,011,669 A | 1/2000 | Apple et al. ................ 360/92 |
| 6,059,509 A | 5/2000 | Ostwald | |
| 6,068,436 A | 5/2000 | Black et al. | |
| 6,085,123 A | 7/2000 | Baca et al. ................. 700/214 |
| 6,231,291 B1 * | 5/2001 | Mueller et al. ............. 414/277 |
| 6,488,462 B1 | 12/2002 | Williams | |
| 6,496,325 B1 * | 12/2002 | Kersey et al. ................ 360/92 |
| 6,574,173 B1 | 6/2003 | Manes ..................... 369/30.48 |
| 6,648,574 B1 | 11/2003 | Williams | |

* cited by examiner

*Primary Examiner*—David Hudspeth
*Assistant Examiner*—James L Habermehl
(74) *Attorney, Agent, or Firm*—Yee & Associates, PC

(57) ABSTRACT

A system, method and program are disclosed for automatically exchanging tape cartridges between a plurality of automated tape libraries arranged in close proximity. The automated cartridge exchange system translates a forward and reverse stroke in a first axis directed parallel to the sidewalls of two adjacent tape libraries to a radial movement directed to a second axis perpendicular to the first axis and into and out of the tape libraries (e.g., via a pass-through port in each library). Thus, the cartridge density of the overall library system is maximized by limiting the width of the main assembly of the automated cartridge exchange system and thereby minimizing the distance between the two adjacent libraries. Also, the automated cartridge exchange system can be blind-mated to the adjacent libraries and thus provide a hot-swappable (on-line), readily serviceable component that is not available from the existing approaches. Furthermore, a plurality of such automated cartridge exchange systems can be installed between adjacent automated tape libraries to provide the redundancy not available from the existing approaches.

20 Claims, 6 Drawing Sheets

AUTOMATED CARTRIDGE EXCHANGE SYSTEM AND METHOD FOR HIGH-DENSITY AUTOMATED TAPE LIBRARIES

BACKGROUND OF THE INVENTION

1. Field of the Invention

The present invention relates generally to high-density automated tape libraries, and in particular, but not exclusively, to a cartridge positioning system for automated tape libraries. More specifically, the present invention provides an improved system and method for automatically exchanging cartridges between high-density automated tape libraries.

2. Background of the Invention

An automated tape library is a self-contained unit that includes a plurality of magnetic tape cartridge storage locations (e.g., cells, slots) that are serviced by a robot mechanism. The robot mechanism retrieves a magnetic tape cartridge from its assigned magnetic tape cartridge storage location in the automated tape library, and loads the retrieved cartridge into a designated tape drive. The tape drive facilitates the reading and/or writing of data from and/or to the magnetic media on the surface(s) of the tape. When the tape drive is finished with the magnetic tape cartridge, the robot mechanism retrieves the cartridge from the tape drive and returns the cartridge to its assigned storage location in the automated tape library.

Automated tape libraries are typically enclosed by a housing to prevent users from interfering with, or being injured by, the robot mechanism. Typically, a cartridge access port is provided to allow users to enter and retrieve magnetic tape cartridges into and from the automated tape library. The cartridge access port provides an apparatus to receive a magnetic tape cartridge from a user and then present the cartridge to the robot mechanism for storage in an assigned magnetic tape cartridge storage location. The apparatus can reverse this operation to enable the robot mechanism to retrieve the tape from the assigned storage location and present it at the access port to the user.

The existing enterprise class data storage market requires high-density, high performance, highly scalable, highly reliable, available, and readily serviceable automated tape library systems. An example of such an enterprise class automated tape library system is the Streamline™ SL8500 Modular Library System produced by Storage Technology Corporation of Louisville, Colo. Such modular library systems are composed of a plurality of juxtaposed automated tape cartridge libraries. A pass-through mechanism is provided to interconnect two juxtaposed automated tape cartridge libraries to enable a robot mechanism in one automated tape cartridge library to pass a selected tape cartridge to a robot mechanism in the second automated tape cartridge library without user intervention. This ability to automatically exchange magnetic tape cartridges between libraries provides a load balancing capability, whereby idle tape drives in an automated tape cartridge library are accessible by a robot mechanism located in an adjacent automated tape cartridge library via the pass-through mechanism.

However, in order to meet the stringent density, performance, scalability, reliability, availability and serviceability requirements imposed by the enterprise class data storage market, the automated exchange of tape cartridges between automated tape libraries needs to be accomplished without significantly compromising the cartridge density of one or both of the juxtaposed automated tape libraries involved.

Also, any apparatus used for automated cartridge exchange needs to provide adequate redundancy to ensure that the stringent enterprise class data storage availability requirements are met. Furthermore, such an automated cartridge exchange apparatus needs to meet the stringent enterprise class data storage serviceability requirements, by enabling the service of faulty components of the exchange apparatus without having to take any additional component of one or both of the adjacent automated tape libraries off-line.

A significant problem with the existing automated tape cartridge exchange devices is that their components are not serviceable without taking one or both of the linked automated tape libraries off-line. Another significant problem with many of the existing automated tape cartridge exchange devices is that only one magnetic tape cartridge can be exchanged at a time, and certain host software may be required to control the operations of the exchange devices and the multiple automated tape libraries involved. In any event, these exchange devices do not provide adequate serviceability and redundancy to meet the enterprise class data storage requirements currently imposed. Other existing automated tape libraries include a pass-through mechanism that provides some serviceability, but does not provide a redundant tape cartridge data path. However, the serviceability of these automated tape libraries is limited significantly, because the pass-through mechanism can be accessed for service only from the top due to the close proximity of the libraries involved. Consequently, in order to service an existing pass-through mechanism, at least one of the adjacent tape libraries has to be shut down.

Notwithstanding the above-described limitations of the existing automated tape library systems and cartridge exchange devices, a more critical problem relates to the inability of the existing automated tape library systems and cartridge exchange devices to meet the stringent density requirements imposed by the enterprise class data storage market. In other words, since the existing cartridge exchange devices are interposed between adjacent tape libraries, the relatively large size and structure of these devices significantly affects the ability of designers to minimize the distance between the tape libraries, which in turn, significantly limits the overall cartridge density of the automated tape library system involved.

Therefore, it is desirable to have an improved system and method for automatically exchanging tape cartridges between automated tape libraries arranged in close proximity, which system and method provide redundancy, high serviceability, and increased cartridge density relative to the prior art approaches.

SUMMARY OF THE INVENTION

The present invention provides a system, method and program for automatically exchanging tape cartridges between a plurality of automated tape libraries arranged in close proximity. In accordance with the present invention, the automated cartridge exchange system translates a forward and reverse stroke in a first axis directed parallel to the sidewalls of two adjacent tape libraries to a radial movement directed to a second axis perpendicular to the first axis and into and out of the tape libraries (e.g., via a pass-through port in each library). Thus, the present invention maximizes the cartridge density of the overall library system by limiting the width of the main assembly of the automated cartridge exchange system and thereby minimizing the distance between the two adjacent libraries. Also, in accordance with the present invention, the automated cartridge exchange system can be blind-mated to the adjacent libraries and thus provide a hot-swappable (on-line), readily serviceable component that is not available from the existing approaches. Furthermore, a plurality of such automated cartridge exchange systems can be installed between adjacent automated tape libraries to provide the redundancy not available from the existing approaches.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
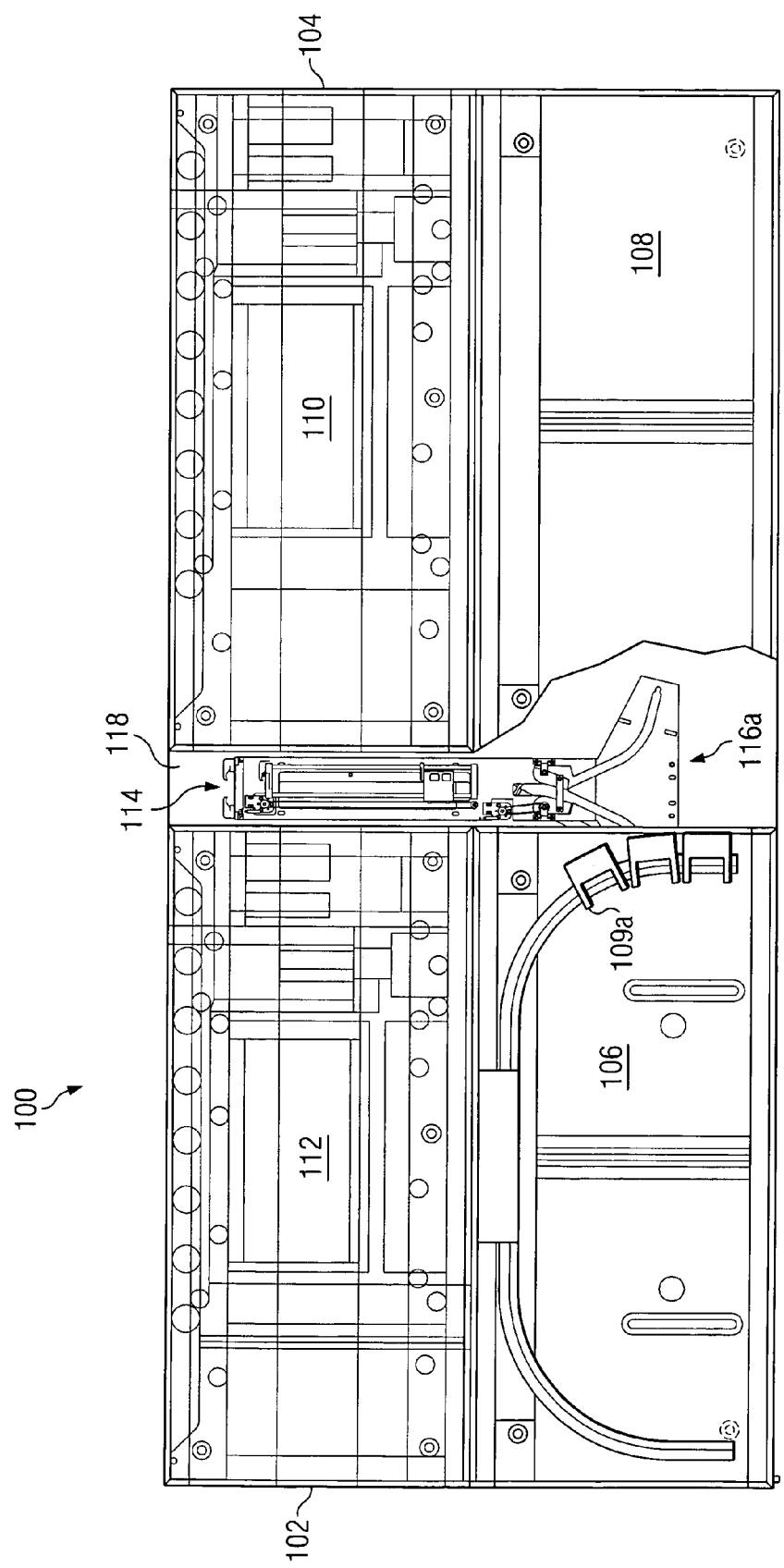
FIGS. 1A and 1B depict related diagrams illustrating an exemplary system of automated tape libraries in which the present invention may be implemented.
Figure 1B:
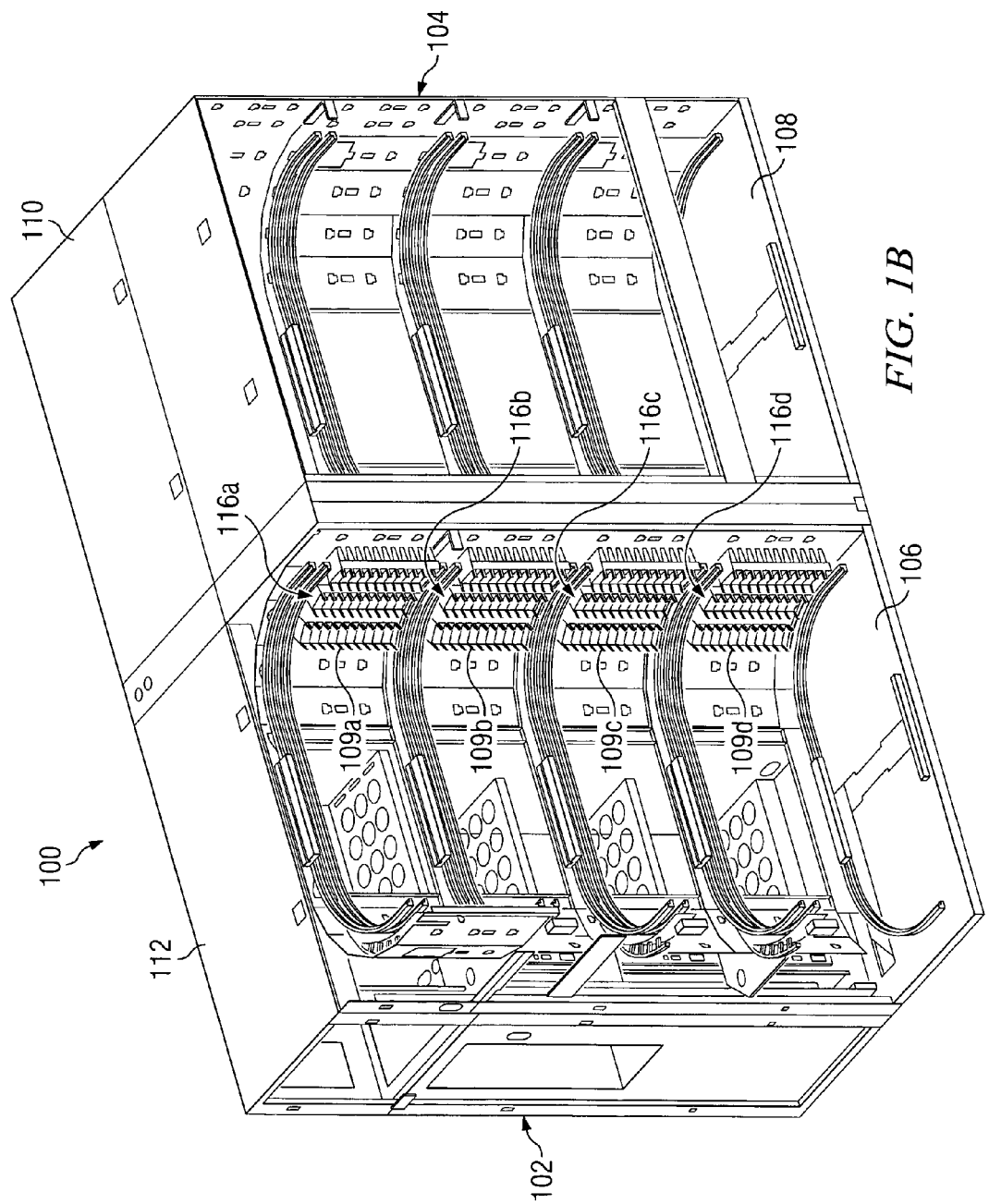

With reference now to the figures and in particular with reference to FIGS. 1A and 1B, related diagrams are depicted illustrating an exemplary system of automated tape libraries in which the present invention may be implemented. System 100 includes a plurality of automated tape libraries 102, 104. For example, system 100 can be an SL8500 Modular Library System produced by Storage Technology Corporation, and each automated tape library 102, 104 can be an individual SL8500 automated tape library unit or module. Notably, although only two automated tape libraries 102, 104 are shown, the depicted example is not intended to impose an architectural limitation with respect to the present invention and may include more than two automated tape libraries. Also, the present invention is not intended to be limited to any particular type or implementation of automated tape library system.

Essentially, an important function of the present invention is to enable the exchange of cartridges between automated tape libraries located in close proximity and/or juxtaposed with respect to one another. In a preferred embodiment, a cartridge exchange unit is provided for exchanging cartridges between two automated tape libraries located in close proximity to each other. For this embodiment, the cartridge exchanges unit is motor driven and self-calibrating so as to ensure a robust design. The linkage of the cartridge exchange unit translates a forward and reverse stroke in a first axis directed parallel to the sidewalls of two adjacent tape libraries to a radial movement directed to a second axis perpendicular to the first axis and into and out of the tape libraries (e.g., via a pass-through port in each library). This linkage and the structure of the cartridge exchange unit minimize the distance between the two juxtaposed libraries and thus maximizes cartridge density for the automated tape library system. Also, the cartridge exchange unit can be blind-mated to the adjacent libraries and thus provide a hot-swappable (on-line), readily serviceable component that is not available in the prior art. Furthermore, a plurality of such cartridge exchange units can be installed between two juxtaposed automated tape libraries to provide the redundancy not available in the prior art.

Specifically, referring again to FIG. 1A, a top-down view of automated tape library 102 is depicted that includes base storage frame assembly 106 and tape drive/electronics frame assembly 112. Similarly, for this illustrative example, a top-down view of automated tape library 104 is also depicted that includes base storage frame assembly 108 and tape drive/electronics frame assembly 110. System 100 also includes cartridge exchange unit 114 arranged between automated tape library 102 and automated tape library 104. For this embodiment, cartridge exchange unit 114 includes two components: sub-frame 118 and end cam 116a. As described in detail below, the switching and positioning mechanisms of cartridge exchange unit 114 are arranged primarily on sub-frame 118. As such, end cam 116a is structured so that a first section of end cam 116a enters a pass-through port of automated tape library 102, and a second section of end cam 116a enters a pass-through port of automated tape library 104. Consequently, a robot mechanism (not shown) of automated tape library 102 can access the first section of end cam 116a, and a robot mechanism (not shown) of automated tape library 104 can access the second section of end cam 116a. The robot mechanism of automated tape library 102 can also access cartridge array 109a for retrieval and storage of individual tape cartridges. Although only cartridge array 109a is shown in automated tape library 102, it should be understood that this cartridge array is shown in FIG. 1A for illustrative purposes only, and automated tape library 104 can also include at least one such cartridge array.

Referring now to FIG. 1B, a perspective view of automated tape library system 100 is depicted. As can be seen, for this embodiment, automated tape library 102 includes a plurality of cartridge arrays 109a–109d. Again, although only cartridge arrays 109a–109d are shown in automated tape library 102, it should be understood that these cartridge arrays are shown in FIG. 1B for illustrative purposes only, and automated tape library 104 can also include a similar plurality of cartridge arrays. For example, if automated tape library system 100 is to be implemented as an SL8500 Modular Tape Library, then automated tape libraries 102, 104 can be implemented as substantially identical automated tape library units or modules. Automated tape library 102 also includes a plurality of pass-through ports 116a–116d. Although not shown in the perspective view of FIG. 1B, automated tape library 104 can also include a plurality of pass-through ports arranged adjacent to pass-through ports 116a–116d.

Those of ordinary skill in the art will appreciate that the hardware depicted in FIGS. 1A and 1B may vary. For example, automated tape library 102 may be structured differently (e.g., internally or externally) from automated tape library 104. In any event, automated tape libraries 102, 104 should be structurally and/or functionally compatible with each other to the extent that cartridge exchange unit 114 can transport and exchange cartridges between automated tape library 102 and automated tape library 104 (e.g., via one or more pass-through ports 116a–116d of automated tape library 102 and one or more counterpart pass-through ports of automated tape library 104).

Figure 2:
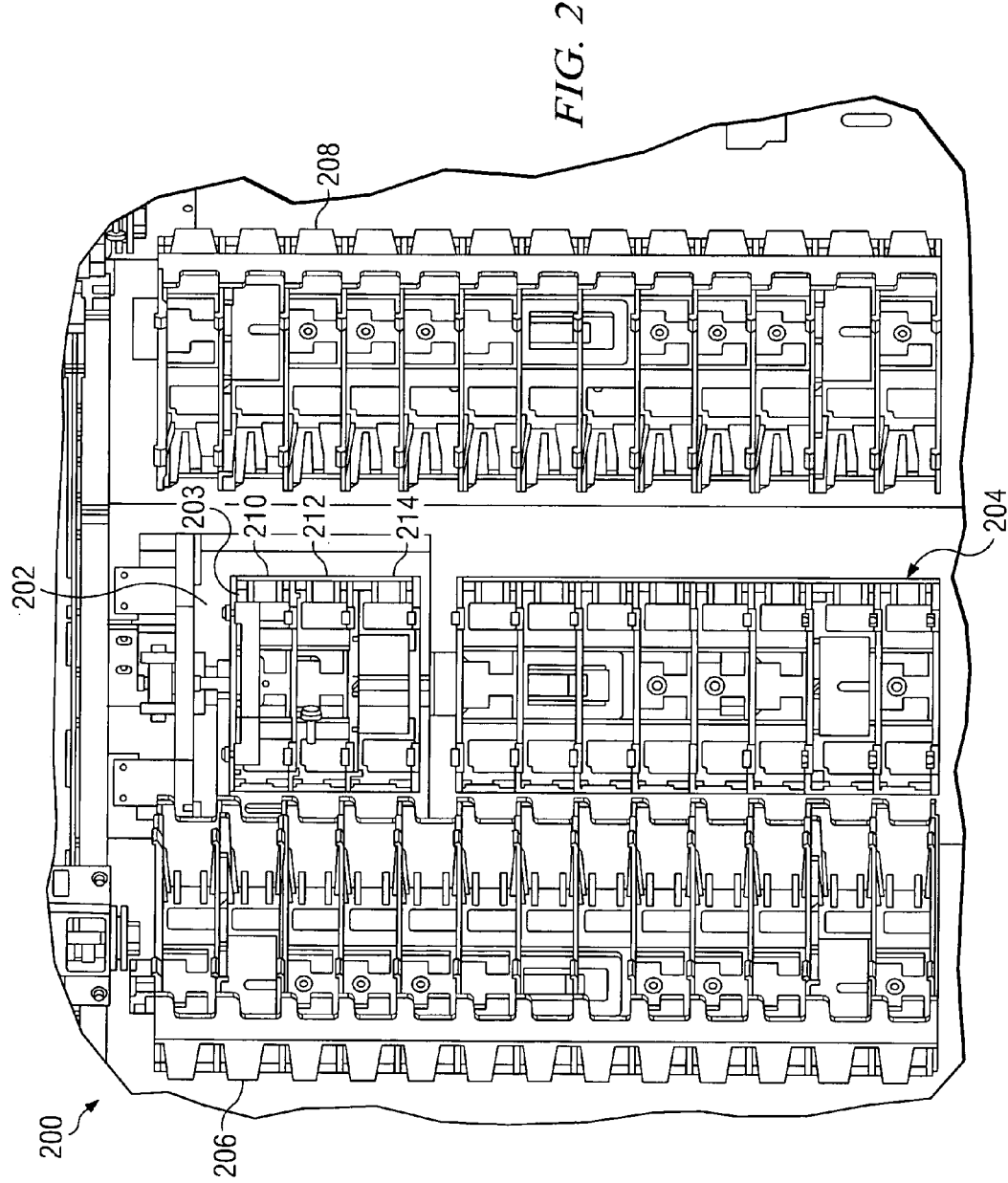
FIG. 2 depicts a diagram illustrating a portion of an automated tape library depicted in FIGS. 1A and 1B.

Referring now to FIG. 2, for illustrative purposes, expanded view 200 of array 109a and pass-through port 116a of automated tape library 102 of FIGS. 1A and 1B is depicted in accordance with a preferred embodiment of the present invention. Notably, expanded view 200 of array 109*a* and pass-through port 116*a* also illustrates the structure and arrangement of each of arrays 109*b*–109*d* and pass-through ports 116*b*–116*d*. Similarly, expanded view 200 can also be used to illustrate one or more arrays and pass-through ports of automated tape library 104. In this case, the pass-through ports for automated tape library 104 are located adjacent to the pass-through ports of automated tape library 102, and therefore, can be illustrated by a reverse (mirror) image of view 200.

Expanded view 200 shows pass-through port 202 (e.g., any one of pass-through ports 116*a*–116*d* depicted in FIG. 1B). For example, pass-through port 202 may be a rectangular cut-away portion of a sidewall of automated tape library 102. Referring also to FIGS. 1A and 1B, note that end cam 116*a* of cartridge exchange unit 114 protrudes or "passes through" respective sidewalls of automated tape libraries 102, 104. Similarly, for this embodiment, end cams for additional cartridge exchange units (not shown) may be envisioned protruding through pass-through ports 116*b*–116*d* of automated tape library 102 and adjacent counterpart pass-through ports (not shown) of automated tape library 104. Cartridge magazine 203 is positioned in and preferably protrudes through pass-through port 202. As described in detail below, cartridge magazine 203 is movably attached to an end cam (e.g., end cam 116*a*) of a cartridge exchange unit (e.g., cartridge exchange unit 114). As such, cartridge magazine 203 includes a plurality of slots 210, 212, 214. For this exemplary embodiment, slot 210 can be an inactive slot (e.g., may or may not be used for cartridge storage), and slots 212, 214 can be active slots that are used for cartridge storage. Thus, a robot mechanism (not shown) of automated tape library 102 can access slots 210, 212 and 214 for retrieval and storage of cartridges.

Array section 204 (e.g., component of array 109*a*) is located adjacent and below pass-through port 202 and cartridge magazine 203 (e.g., whenever cartridge exchange unit 114 positions cartridge magazine 203 in pass-through port 202). For example, in an SL8500 library environment, array section 204 is an abbreviated section (e.g., to allow for cartridge magazine 203) that can include eight cells (or slots) for cartridge storage. Also, cartridge array sections 206, 208 are located adjacent and to each side of cartridge magazine 203 and array section 204. As such, any of the active cells or slots of cartridge magazine 203 and array sections 204, 206, 208 can be accessed for retrieval and storage by a robot mechanism (not shown) of automated tape library 102. Those of ordinary skill in the art should appreciate that expanded view 200 illustrates that a similar arrangement of a cartridge magazine and adjacent array sections is also available for use in conjunction with a robot mechanism of automated tape library 104.

Figure 3A:
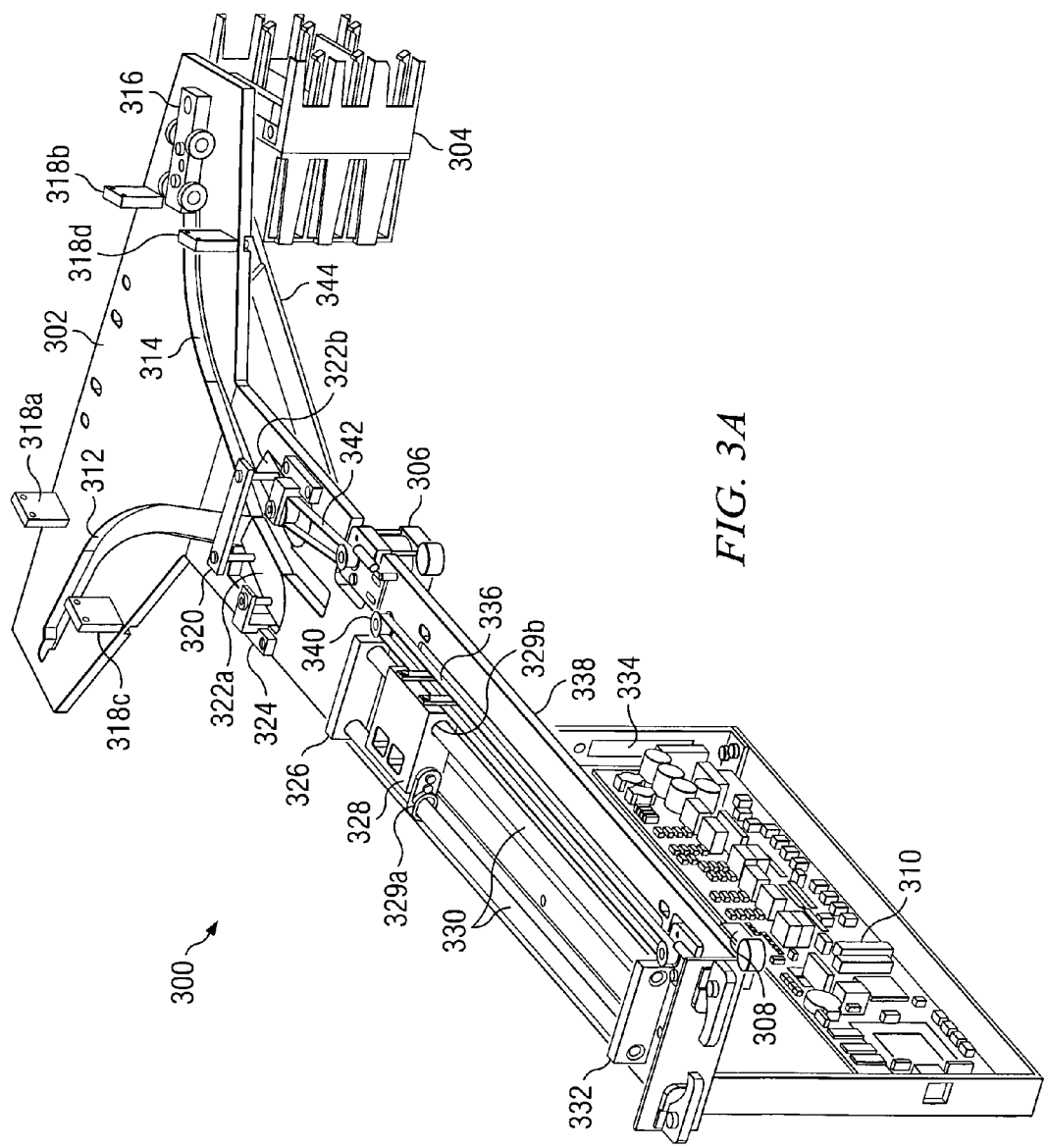
FIGS. 3A–3C depict related diagrams illustrating an automated cartridge exchange system for automated tape libraries in accordance with a preferred embodiment of the present invention.
Figure 3B:
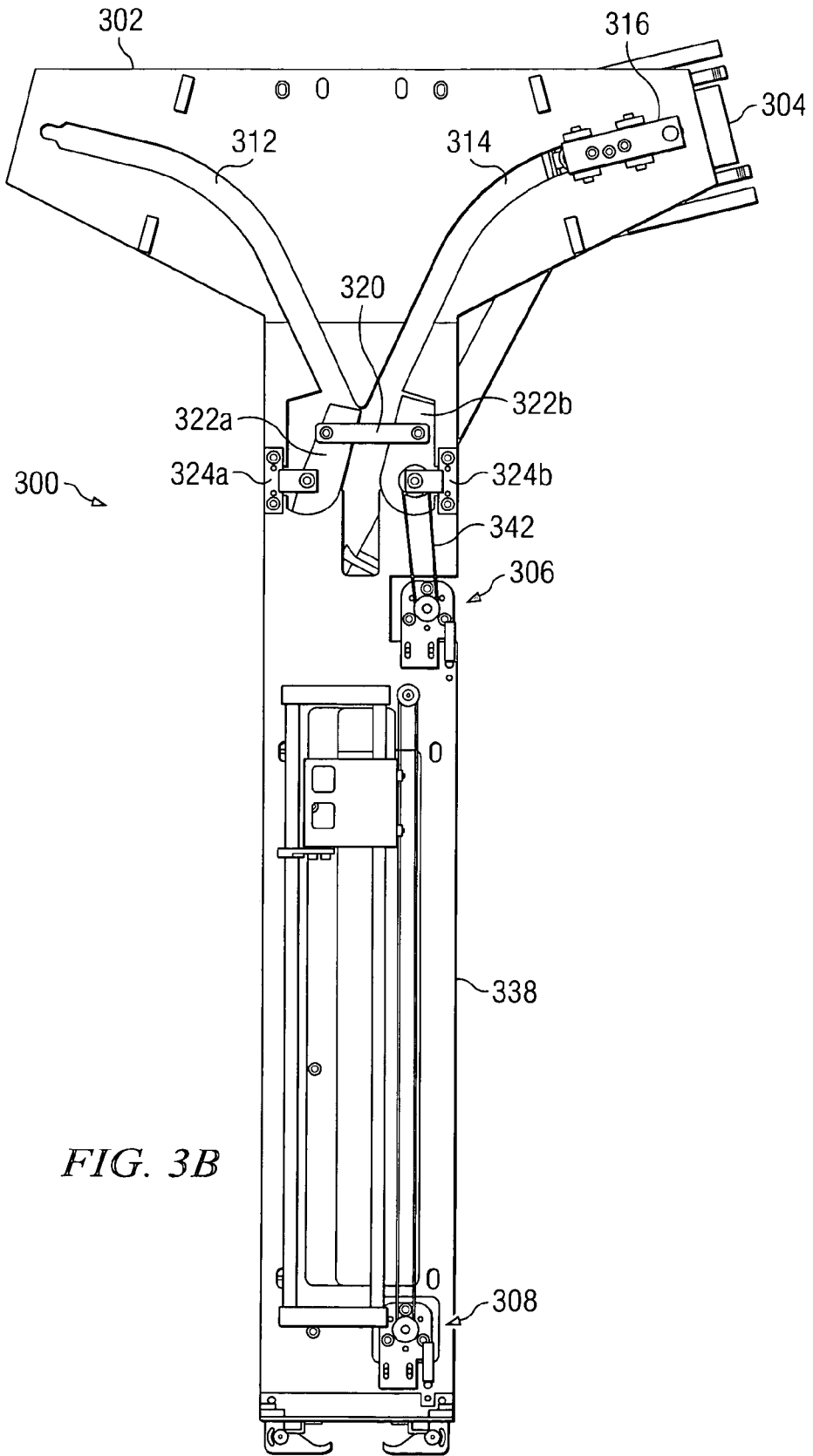
Figure 3C:
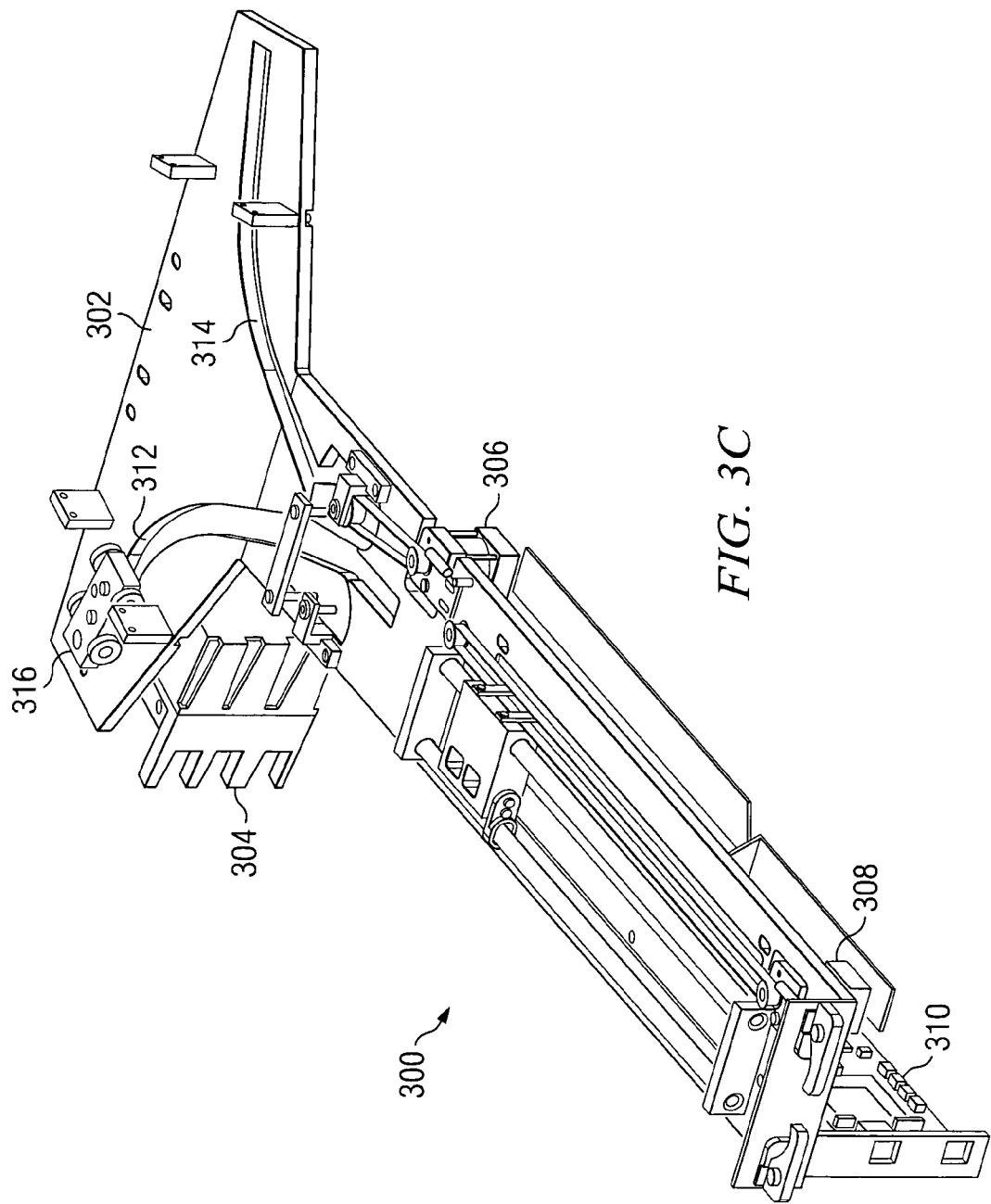

Referring now to FIGS. 3A–3C, related diagrams illustrating different views of an automated cartridge exchange system for automated tape libraries are depicted in accordance with a preferred embodiment of the present invention. For example, the automated cartridge exchange system described herein can be used to implement the cartridge transport, exchange and storage functions of cartridge exchange unit 114 in FIGS. 1A–1C.

Essentially, FIG. 3A depicts a perspective view of automated cartridge exchange system 300, FIG. 3B depicts a top-view of automated cartridge exchange system 300, and FIG. 3C depicts a second view of automated cartridge exchange system 300 with the same perspective as FIG. 3A. However, FIG. 3A differs from FIG. 3C primarily in that automated cartridge exchange system 300 in FIG. 3A (and 3B) is depicted with cartridge magazine 304 positioned at the right-most portion of end cam 302, and automated cartridge exchange system 300 in FIG. 3C is depicted with cartridge magazine 304 positioned at the left-most portion of end cam 302. Thus, in accordance with the present invention, these differences illustrate the cartridge exchange features of automated cartridge exchange system 300.

Specifically, referring to related FIGS. 3A–3C, certain salient components of automated cartridge exchange system 300 include end cam 302, magazine 304, switch motor 306, drive motor 308, and controller card 310. End cam 302 is fixedly attached to (e.g., bolted together with) main guide assembly 338. For this exemplary embodiment, end cam 302 and main guide assembly 338 both form a fixed framework or base structure for automated cartridge exchange system 300. As such, switch motor 306, drive motor 308 and controller card 310 are mounted on main guide assembly 338. Additional salient components of automated cartridge exchange system 300 include left track 312 and right track 314. As illustrated more clearly in FIG. 3B, left track 312 and right track 314 are cutaway portions of end cam 302 and main guide assembly 338 that form individual "tracks" which separately extend from main guide assembly 338 to the left-most and right-most portions, respectively, of end cam 302. Magazine carriage 316 is movable and can be positioned at any location on left track 312 or right track 314.

FIGS. 3A and 3B depict magazine carriage 316 positioned on right track 314 at the right-most portion of end cam 302, and FIG. 3C depicts magazine carriage 316 positioned on left track 312 at the left-most portion of end cam 302. Preferably, magazine carriage 316 includes a set of rollers or wheels to enhance movement of magazine carriage 316 along left track 312 or right track 314. Magazine 304 is coupled to magazine carriage 316 (e.g., via one or more bolts) through left track 312 or right track 314 so that magazine 304 and magazine carriage 316 can be positioned in unison anywhere along left track 312 or right track 314.

Automated cartridge exchange system 300 also includes a plurality of mounting blocks 318*a*–318*d* for attaching end cam 302 to a respective sidewall of each automated tape library involved (e.g., libraries 102, 104). For example, considering the relative orientations of end cam 116*a* in FIGS. 1A–1B, and end cam 302 in FIGS. 3A–3C, mounting blocks 318*b* and 318*d* can be used to attach end cam 302 to a sidewall of automated tape library 102, and mounting blocks 318*a* and 318*c* can be used to attach end cam 302 to a sidewall of automated tape library 104.

Focusing on FIG. 3B, switch belt 342 couples the bi-directional rotational force of switch motor 306 to switch linkage 320. Thus, for example, a rotational force of switch motor 306 in a clockwise direction is transferred via switch belt 342 to cause switch linkage 320 to move in a clockwise direction. Similarly, for example, a rotational force of switch motor 306 in a counter-clockwise direction is transferred via switch belt 342 to cause switch linkage 320 to move in a counter-clockwise direction. For this embodiment, switch linkage 320 is attached to switch levers 322*a* and 322*b*. One link of switch linkage 320 is attached to switch lever 322*a*, and a second link of switch linkage 320 is attached to switch lever 322*b*. Therefore, switch linkage 320 translates a clockwise rotation of switch motor 306 to a clockwise rotation of switch levers 322*a* and 322*b*. Similarly, switch linkage 320 translates a counter-clockwise rotation of switch motor 306 to a counter-clockwise rotation of switch levers 322*a* and 322*b*. Thus, a clockwise rotation of switch motor 306 can position switch lever 322*a* so as to "close" left track 312 and "open" right track 314 for movement of magazine carriage 316 and magazine 304. This feature is illustrated in FIG. 3B. Conversely, a counter-clockwise rotation of switch motor 306 positions switch lever 322a so as to "open" left track 312 and "close" right track 314 for movement of magazine carriage 316 and magazine 304. This feature is illustrated in FIG. 3C. For this exemplary embodiment, the rotational direction of switch motor 306 controls the destination (e.g., pass-through port of automated tape library 102 or 104) of magazine 304 and any cartridge(s) stored therein. Switch brackets 324a and 324b can be used for attaching respective switch levers 322a and 322b to main guide assembly 338.

Additionally, automated cartridge exchange system 300 includes a plurality of drive components for positioning magazine carriage 316 and magazine 304. For this embodiment, top end plate 326 and bottom end plate 332 are attached (e.g., bolted) to main guide assembly 338. A plurality of linear rails 330 are attached at opposite ends to top end plate 326 and bottom end plate 332 so as to span the distance between top end plate 326 and bottom end plate 332 with clearance to main guide assembly 338. Drive carriage 328 includes a plurality of guide channels 329a and 329b arranged parallel to linear rails 330. The plurality of linear rails 330 can be inserted through respective guide channels 329a and 329b so that drive carriage 328 can be slid and positioned anywhere along linear rails 330. Drive belt 336 is coupled between drive motor 308 and idler pulley 340 and also attached to a sidewall of drive carriage 328. Therefore, drive belt 336 can translate a rotational force from drive motor 308 to a linear force at drive carriage 328 in order to position drive carriage 328 in a linear direction along linear rails 330. For this exemplary embodiment, a clockwise rotation of drive motor 308 causes drive carriage 328 to move in a line towards end cam 302. Conversely, a counter-clockwise rotation of drive motor 308 causes drive carriage 328 to move in a linear direction away from end cam 302. Blind mate opening 334 is provided in controller card 310 to enhance the ability to hot-swap components and thereby increase reliability. Link arm 344 is attached at one end to drive carriage 328 and at the opposite end to magazine carriage 316 so as to synchronize the movement of magazine carriage 316 with that of drive carriage 328 (e.g., drive carriage 328 drives magazine carriage 316).

In an exemplary operation, a controller subsystem of an automated tape library (e.g., library 102 or 104 in FIGS. 1A–1B) initiates a pass-through operation to exchange one or more cartridges from one tape library to an adjacent tape library. Assuming, for illustrative purposes, that magazine 304 (FIGS. 3A–3C) is initially positioned in a pass-through port of library 104, and a robotic "hand" of library 104 places a data cartridge into a slot (e.g., active slot 212 in FIG. 2) of magazine 304. Controller card 310 sends an appropriate drive signal to drive motor 308 that causes drive motor 308 to rotate in either a clockwise or counter-clockwise direction. In response, drive motor 308 rotates in a selected direction and thereby moves drive belt 336 accordingly. In turn, drive belt 336 "pulls" or "pushes" drive carriage 328 along linear rails 330 (e.g., toward or away from bottom end plate 332 dependent upon the rotational direction of drive motor 308). Link arm 344 transfers the movement of drive carriage 328 to magazine carriage 316.

For this example, in order to transport one or more cartridges from automated tape library 104 to automated tape library 102, controller card 310 causes drive motor 308 to rotate counter-clockwise so as to "pull" magazine carriage 316 along right track 314 and away from the pass-through port of library 104 until magazine carriage 316 reaches a "neutral" position (e.g., a location below the point of convergence of left track 312 and right track 314 in FIG. 3B). Placing magazine carriage 316 in this "neutral" position allows unimpeded movement of switch levers 322a and 322b. Controller card 310 sends an appropriate drive signal to switch motor 306, which causes (for this example) switch motor 306 to rotate in a counter-clockwise direction. Switch belt 342 transfers the rotational force from switch motor 306 to switch lever 322b. For this example, this particular switching operation "closes" right track 314 and "opens" left track 312 for travel by magazine carrier 316. Clearly, an opposite switching operation would "open" right track 314 for travel by magazine carriage 316, and "close" left track 312. Controller card 310 then sends an appropriate drive signal to drive motor 308 to cause drive motor 308 to rotate (for this example) in a clockwise direction. This rotational force is transferred by drive belt 338 to drive carriage 328, which "pushes" drive carriage 328 forward and along linear rails 330 away from bottom end plate 332. Link arm 344 rotates in a counter-clockwise direction and transfers the movement of drive carriage 328 to magazine carriage 316. Magazine carriage 316 is driven along left track 312 and thereby moves magazine 304 to the pass-through port (e.g., pass-through port 202 in FIG. 2) of automated tape library 102. A robotic "hand" of library 102 can retrieve the one or more cartridges stored in magazine 304.

Advantageously, in accordance with the present invention, the above-described linkage of the automated cartridge exchange system translates a forward and reverse stroke in a first axis directed parallel to the sidewalls of two adjacent tape libraries to a radial movement directed to a second axis perpendicular to the first axis and directed into and out of the tape libraries (e.g., via a pass-through port in each library). Thus, the present invention maximizes the cartridge density of the overall library system by limiting the width of the main assembly of the automated cartridge exchange system and thereby minimizing the distance between the two adjacent libraries. Also, in accordance with the present invention, the automated cartridge exchange system can be blind-mated to the adjacent libraries and thus provide a hot-swappable (on-line), readily serviceable component that is not available from the existing approaches. Furthermore, a plurality of such automated cartridge exchange systems can be installed between adjacent automated tape libraries to provide the redundancy not available from the existing approaches.

It is important to note that while the present invention has been described in the context of a fully functioning automated cartridge exchange system including data processing functions, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An automated tape library system, comprising:
   a first tape library;
   a second tape library located adjacent to said first tape library; and
   an exchange unit for transporting at least one tape storage unit from said first tape library to said second tape library, said exchange unit arranged between said first tape library and said second tape library, said exchange unit comprising:
   a movable transport unit, said movable transport unit for transport of said at least one tape storage unit from said it tape library to said second tape library;
   a movable drive unit, said movable drive unit linked to said movable transport unit; and
   a direction translation unit coupled to said movable transport unit and said movable drive unit, said direction translation unit operable to translate a forward and reverse stroke of the movable transport unit in a first axis directed parallel to a sidewall of said first tape library and a sidewall of said second tape library to a radial movement of said movable transport unit directed toward and away from said sidewall of said first tape library or toward and away from said sidewall of said second tape library.

2. The automated tape library system of claim 1, wherein said first tape library comprises an automated magnetic tape cartridge library.

3. The automated tape library system of claim 1, wherein said at least one tape storage unit comprises a magazine.

4. The automated tape library system of claim 1, wherein said movable transport unit comprises a magazine carriage.

5. The automated tape library system of claim 1, wherein said movable drive unit comprises a drive carriage.

6. The automated tape library system of claim 1, wherein said radial movement of said movable transport unit comprises a movement guided by a radial track.

7. The automated tape library system of claim 1, wherein said sidewall of said first tape library includes a first pass-through port, and said sidewall of said second tape library includes a second pass-through port.

8. The automated tape library system of claim 1, wherein said direction translation unit comprises:
   a drive motor coupled to a drive carriage;
   a linkage coupling said drive carriage to a magazine carriage;
   a right radial track for guiding movement of said magazine carriage toward or away from said second tape library; and
   a left radial track for guiding movement of said magazine carriage toward or away from said first tape library.

9. A method for exchanging cartridges between a first tape library and a second tape library located adjacent to said first tape library, comprising the steps of:
   activating a forward or reverse stroke of a movable transport unit in a first axis directed parallel to a sidewall of said first tape library and a sidewall of said second tape library using a direction translation unit coupled to the movable transport unit, wherein the direction translation unit is operable to translate the forward and reverse stroke of the movable transport unit in a first axis directed parallel to the sidewall of the first tape library and the sidewall of the second tape library to a radial movement of the movable transport unit directed toward and away from the sidewall of the first tape library or toward and away from the sidewall of the second tape library; and
   translating said forward and reverse stroke to a radial movement of the movable transport unit directed toward and away from said sidewall of said first tape library or toward and away from said sidewall of said second tape library.

10. The method of claim 9, wherein said first tape library comprises an automated magnetic tape cartridge library.

11. The method of claim 9, further comprising a movable drive unit coupled to said movable transport unit, said movable drive unit performing said forward and reverse stroke.

12. The method of claim 9, wherein said movable transport unit comprises a magazine carriage.

13. The method of claim 9, wherein said movable drive unit comprises a drive carriage.

14. The method of claim 9, wherein said radial movement of said movable transport unit comprises a movement guided by a radial track.

15. The method of claim 9, wherein said sidewall of said first tape library includes a first pass-through port, and said sidewall of said second tape library includes a second pass-through port.

16. The method of claim 9, wherein the direction translation unit comprises:
   a drive motor coupled to said movable drive unit;
   a linkage coupling said movable drive unit to said movable transport unit;
   a right radial truck for guiding movement of said movable transport unit toward or away from said second tape library; and
   a left radial track for guiding movement of said movable transport unit toward or away from said first tape library.

17. A computer program product in a computer readable medium for use in exchanging cartridges between a first automated tape library and a second automated tape library located adjacent to said first automated tape library, the computer program product comprising:
   first instructions for activating a forward or reverse stroke of a movable transport unit in a first axis directed parallel to a sidewall of said first automated tape library and a sidewall of said second automated tape library using a direction translation unit coupled to the movable transport unit, wherein the direction translation unit is operable to translate the forward and reverse stroke of the movable transport unit in a first axis directed parallel to the sidewall of the first tape unit directed toward and away from the sidewall of the first tape library or toward and a from the sidewall of the second tape library; and
   second instructions for translating said forward and reverse stroke to a radial movement of the movable transport unit directed toward and away from said sidewall of said first automated tape library or toward and away from said sidewall of mid second automated tape library.

18. The computer program product of claim 17, wherein said first tape library comprises an automated magnetic tape cartridge library.

19. The computer program product of claim 17, further comprising a movable drive unit coupled to said movable transport unit, said movable drive unit performing said forward and reverse stroke.

20. The computer program product of claim 17, wherein said movable transport unit comprises a magazine carriage.

* * * * *